(12) United States Patent
Gard et al.

(10) Patent No.: US 7,038,454 B2
(45) Date of Patent: *May 2, 2006

(54) SYSTEM AND METHOD FOR DETECTING AN UNDERGROUND OBJECT USING MAGNETIC FIELD SENSING

(75) Inventors: Michael F. Gard, Perry, OK (US); Jian Jin, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 177 days.

This patent is subject to a terminal disclaimer.

(21) Appl. No.: 10/134,985

(22) Filed: Apr. 29, 2002

(65) Prior Publication Data

US 2002/0190718 A1     Dec. 19, 2002

Related U.S. Application Data

(63) Continuation of application No. 08/999,166, filed on Dec. 30, 1997, now Pat. No. 6,411,094.

(51) Int. Cl.
*G01V 3/11* (2006.01)

(52) U.S. Cl. .......................... 324/326; 175/45
(58) Field of Classification Search ............. 324/326, 324/346; 175/45
See application file for complete search history.

(56) References Cited

U.S. PATENT DOCUMENTS

| 3,529,682 | A |   | 9/1970  | Coyne et al. ............ 175/45 |
|-----------|---|---|---------|--------------------------------|
| 3,589,454 | A |   | 6/1971  | Coyne ..................... 175/26 |
| 3,712,391 | A | * | 1/1973  | Coyne ..................... 175/45 |
| 4,072,200 | A | * | 2/1978  | Morris et al. ............ 324/346 |
| 4,639,674 | A |   | 1/1987  | Rippingale .............. 324/326 |
| 4,700,142 | A |   | 10/1987 | Kuckes ................... 324/326 |
| 4,710,708 | A | * | 12/1987 | Rorden et al. ........ 324/207.26 |
| 4,875,014 | A |   | 10/1989 | Roberts et al. .......... 324/326 |
| 5,002,137 | A |   | 3/1991  | Dickinson et al. ........ 175/19 |
| 5,064,006 | A |   | 11/1991 | Waters et al. ............. 175/45 |
| 5,155,442 | A |   | 10/1992 | Mercer .................... 324/690 |
| 5,218,301 | A |   | 6/1993  | Kuckes ................... 324/346 |
| 5,258,755 | A | * | 11/1993 | Kuckes ................... 340/853.5 |
| 5,513,710 | A | * | 5/1996  | Kuckes ..................... 175/45 |
| 5,515,931 | A |   | 5/1996  | Kuckes ..................... 175/45 |
| 5,657,826 | A |   | 8/1997  | Kuckes ..................... 175/45 |
| 5,711,381 | A |   | 1/1998  | Archambeault et al. ... 175/45 |
| 5,725,059 | A |   | 3/1998  | Kuckes et al. ............ 175/45 |
| 5,994,904 | A | * | 11/1999 | Eslambolchi et al. ..... 324/326 |

FOREIGN PATENT DOCUMENTS

| EP | 0366567 A2 |   | 5/1990 |
|----|-----------|---|--------|
| EP | 0428180 A1 | * | 5/1991 |

* cited by examiner

*Primary Examiner*—Jay Patidar
(74) *Attorney, Agent, or Firm*—Tomlinson & O'Connell, PC

(57) ABSTRACT

A system and method use magnetic field sensing to detect underground objects for strike avoidance. The system detects magnetic field components for both passive distortions in the magnetic field indicative of a ferromagnetic object and active magnetic fields that are impressed on an object by a signal generator. A detection module has a magnetic sensor assembly that detects the magnetic field components. The magnetic field component data is transferred through a multiplexer to an analog/digital converter to a processor. Pitch angle data from a pitch sensor and roll angle data from a roll sensor also may be transferred to the processor. The data is processed by the processor to determine the orientation of the detection module with respect to the object. The detection module may be installed in an underground boring tool or a trenching assembly.

27 Claims, 8 Drawing Sheets

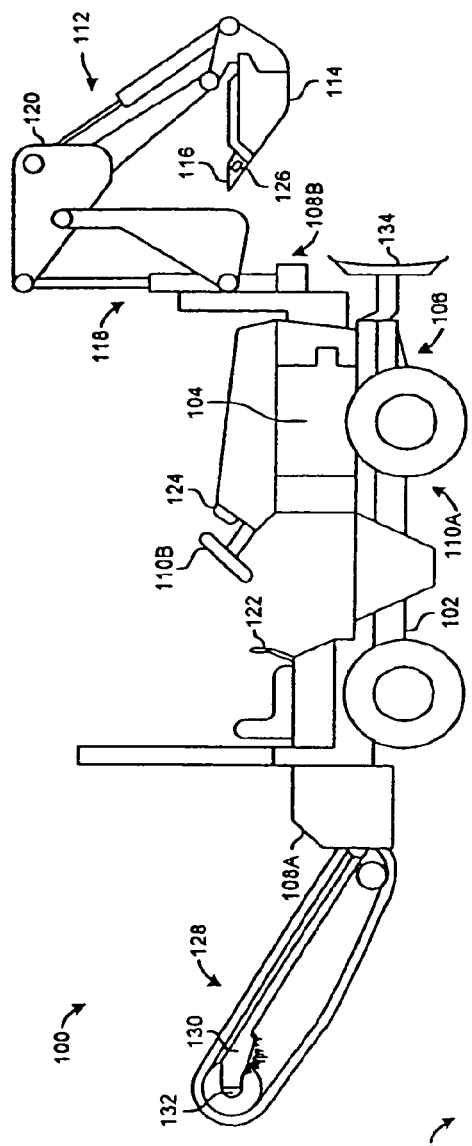
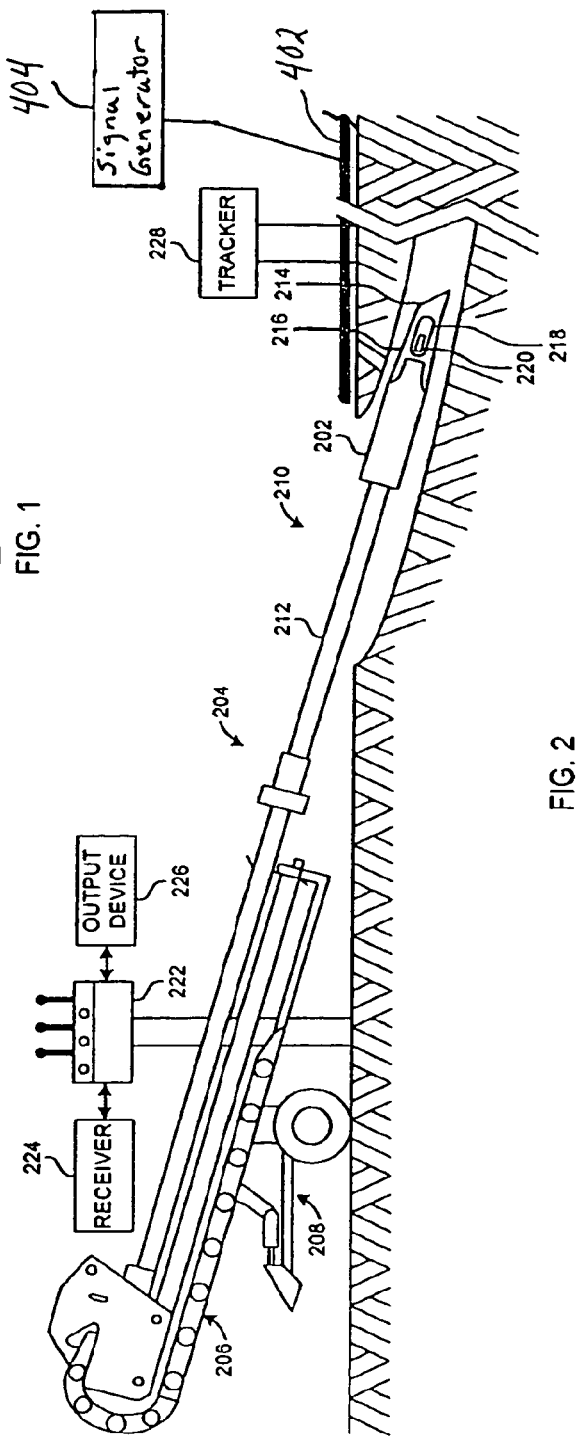
FIG. 1
FIG. 2

SYSTEM AND METHOD FOR DETECTING AN UNDERGROUND OBJECT USING MAGNETIC FIELD SENSING

FIELD OF THE INVENTION

The present invention relates to the field of using magnetic field sensing to detect underground objects during trenching or boring.

SUMMARY OF THE INVENTION

The present invention comprises a detection system for use in boring or trenching to detect an object in an area of the boring or trenching having a detection module. The detection module comprises a magnetic sensor assembly adapted to detect magnetic field components from a passive magnetic field distortion. The passive magnetic field distortion is caused by the object. The magnetic sensor assembly is adapted to transmit the magnetic field components. The detection module further comprises a processor adapted to receive the magnetic field components that are detected by the magnetic sensor assembly and to process the magnetic field components to determine the total magnetic field of the passive magnetic field distortion. The processor compares the total magnetic field to a setpoint to determine if the total magnetic field varies from the setpoint by more than a designated tolerance to determine if the passive magnetic field distortion is within a designated distance of the detection module, thereby determining if the object is within the designated distance of the detection module.

Further, the present invention comprises a detection system for use in boring or trenching to detect an object in an area of the boring or trenching having a detection module. The detection module comprises a magnetic sensor assembly that is adapted to detect magnetic field components from an active magnetic field which is emanating from the object and to transmit the magnetic field components. A processor is adapted to receive the magnetic field components that are transmitted from the magnetic sensor assembly. The processor is adapted to reproject the magnetic field components to a consistent reference plane to remove angular influence from the magnetic field components and to process the magnetic field components to determine an orientation from the detection module to the object.

In another aspect, the present invention comprises a detection module for detecting an object in an area near the detection module. The detection module comprises a plurality of magnetic field sensors each adapted to detect a magnetic field component from a magnetic field characteristic indicative of the object and to transmit the magnetic field component in a sensor signal. The detection module includes a plurality of filter/preamplifier assemblies each adapted to receive one of the sensor signals from the magnetic field sensors, to filter signal components from the received sensor signal, and to amplify the received sensor signal. The detection module also includes a plurality of filter/amplifier assemblies each adapted to receive one of the sensor signals from the filter preamplifier assemblies, to filter spectral components from the received sensor signal, and to amplify the received sensor signal. A processor is adapted to receive the sensor signals from the filter/amplifier assemblies and to process the magnetic field components in the sensor signals to determine the orientation of the detection module to the object.

In yet another aspect, the present invention comprises a method for detecting an object in an area near boring or trenching. The method comprises determining a setpoint for a magnetic field of an area. A plurality of magnetic field components for a magnetic field characteristic caused by the object in the area are detected. The magnetic field components are processed to determine a total magnetic field for the area. It is determined if the total magnetic field varies from the setpoint by more than a designated tolerance to determine if the object is within the area.

In still another aspect, the present invention comprises a method for detecting an object in an area near a detection module. The method comprises detecting a plurality of magnetic field components for an active magnetic field from the object in the area. The magnetic field components are processed to determine the orientation of the detection module with respect to the active magnetic field, thereby determining the orientation of the detection module to the object. The processing step comprises reprojecting the magnetic field components to a consistent reference plane to remove angular influence from the magnetic field components.

Further still, the present invention comprises a system for detecting an object. The system comprises an assembly adapted for use in at least one of boring or trenching. The system further includes a detection module located in the assembly and adapted to detect the object. The detection module comprises a magnetic sensor assembly adapted to detect magnetic field components from a magnetic field characteristic associated with the object and to transmit the magnetic field components. The detection module further comprises a processor adapted to receive the magnetic field components that are detected by the magnetic sensor assembly and to process the magnetic field components to determine the orientation of the detection module relative to the object. The orientation determination of the detection module is processed independent from a prior determination and is not an incremental correction.

BRIEF DESCRIPTION OF THE DRAWINGS

FIG. 1 is a diagrammatic view of a trenching assembly with a detection module in accordance with the present invention.

FIG. 2 is a diagrammatic view of a boring assembly attached to a boring tool with a detection module in accordance with the present invention.

DETAILED DESCRIPTION OF THE PREFERRED EMBODIMENTS

Figure 5:
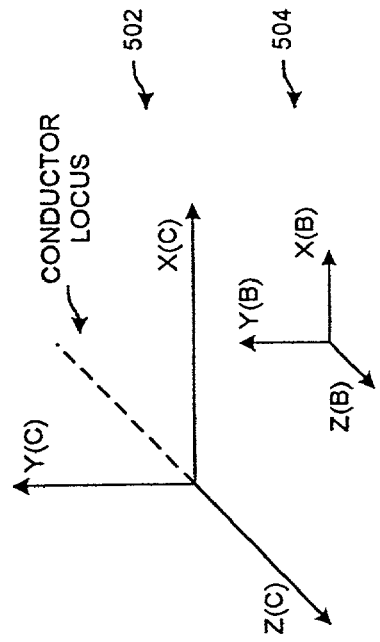
FIG. 5 is a coordinate diagram for a filament conductor and a beacon with a detection module.

Many problems and losses are associated with accidental strikes of underground lines, such as fiber optic cable and other telecommunications lines, cable television service, electrical service, water lines, sewers, and other utility connections. Backhoes most often are involved in accidental strikes of underground objects. In addition, other trenchers and subsurface boring units typically are involved in such accidental strikes.

Thus, a system is needed to determine when a backhoe, subsurface boring tool, or other trenching or trenchless device is in danger of accidentally striking an underground object. A flexible system is needed to determine the possibility of striking known underground objects that have unknown or unidentifiable locations as well as unknown underground objects.

The system of the present invention provides the ability to detect underground objects that may be within a zone of a possible accidental strike by a boring tool or a trenching tool. The present invention provides the ability to detect unknown and known objects that are underground and to provide the position, including the relative distance and the orientation, of the boring tool with respect to the objects. In addition, the invention may be used for closed-loop control to navigate a boring tool. Moreover, the system of the present invention is adaptable and may be used in a variety of applications, including use in a backhoe tooth or a trenching boom and use in a subsurface boring tool.

Surface boring and trenching systems, such as a backhoe, typically comprise a frame with a drive system and a steering system. The drive system generally includes an engine providing power to a ground drive and a trencher drive. The trenching system may include several trenching tools for digging and trenching, including a backfill blade, a trencher with a boom, an auger, a plow, a saw, or a backhoe.

Turning now to the drawings in general and to FIG. 1 specifically, there is shown a trenching assembly designated generally by the reference numeral 100. The trenching assembly 100 has a frame-chassis 102 and an engine 104 associated with a ground drive 106 and a trenching drive 108A and 108B which each provide forward and reverse speeds. A steering assembly 110A and 110B provides maneuverability for the trenching assembly 100.

The trenching assembly 100 has a trenching tool, such as a backhoe assembly 112, for digging and removing material from a digging site. The backhoe assembly 112 has a scoop 114 with teeth 116 that can pierce the earth and dig. A hydraulic lift assembly 118 has a boom 120 that moves the scoop 114 during the digging operation and is controlled by a set of controls 122. A control panel 124 having indicators and additional controls allows an operator to monitor digging activity and the status of the engine 104 and other systems in the trenching assembly 100.

A detection module 126 is located in one of the teeth 116 of the scoop 114 of the backhoe assembly 112. As explained more fully below, the detection module 126 uses various sensor assemblies to detect characteristics of the earth's magnetic field which may be indicative of underground objects, such as utility lines and utility pipes. The detection module 126 may be used to detect passive distortions caused by an underground ferromagnetic body in addition to active impressions caused by a signal that is impressed on a utility line or other underground object. The term "characteristic" as used herein with reference to a magnetic field means a passive distortion in the earth's magnetic field or an active impression of a magnetic field.

The detection module 126 collects data from its sensor assemblies and transfers the data to a receiver, such as the control panel 124, or to a warning device using a physical data link, a radio frequency, or some other wireless transmitter. The detection module 126 may process the data prior to sending the data to the control panel 124. Preferably, object strike data is collected and processed by the detection module and displayed visually or audibly to an operator at the control panel 124. For example, if a strike of an object by the trenching assembly 100 is possible, an alarm may sound on the control panel 124 or the trenching assembly 100 may automatically shut down. A description of the components and operation of the detection module 126 is explained more completely below.

It will be appreciated that the trenching assembly 100 may have other trenching tools. For example, the trenching assembly 100 may have another trenching tool, such as a trencher 128 with its associated boom 130, that is used to cut a trench. A detection module 132 may be located in the boom 130. Another trenching tool, such as a backfill blade 134, may be used to backfill a trench or to otherwise move earth.

While the particular trenching assembly 100 shown in FIG. 1 uses a backhoe and a trencher mechanism, the term "trenching assembly" as used herein is intended to include all types of trenching systems regardless of the nature of the configuration, chassis, trenching tools, or drive mechanism. Similarly, the term "trenching tool" as used herein includes a variety of permanent or replaceable trenching tools, including the saw, the auger, the trencher, the backfill blade, the plow, the backhoe, and others. In addition, a detection module may be used in conjunction with any of the trenching tools and would be placed in an appropriate location.

Subsurface trenchless boring systems typically comprise a boring tool capable of drilling or piercing the earth. The boring tool is launched from a rig above ground and driven by a variety of mechanisms including rotary boring drilling systems, jacking assemblies, and pneumatic and non-pneumatic percussive devices. The boring tool is supported on the end of a drill string or air hose, depending on the drive mechanism. Navigation mechanisms have been developed for controlling the direction and speed of the boring tool during the boring operation, and various tracking and locating devices have been used for determining the location, direction, and roll of the boring tool in the bore hole.

The tracking, locating, and navigation mechanisms use cooperating transmitting and receiving devices. Typically, the transmitting device is an antenna circuit and system in a detection module of a beacon or sonde of a drilling tool. The transmitter may transmit information to a receiving device using a fixed frequency, a variable frequency, or some other wireline or wireless method. The receiving device may process the information transmitted by the transmitter. In addition, the receiving device may retransmit the information, before or after processing, to another receiver.

Turning now to FIG. 2, there is shown a boring assembly designated generally by the reference numeral 200 and constructed in accordance with the present invention. The boring assembly 200 generally comprises a boring tool 202 adapted to pierce or drill through the earth. The boring tool 202 is controlled by a control system 204 which steers and drives the boring tool 202. In the boring assembly 200 illustrated in FIG. 2, the control system 204 uses a boring drive system 206 supported on a rig or trailer 208 at the launch site 210. The boring tool 202 is connected to the boring drive system 206 by means of a drill string 212.

The control system 204 includes a steering system incorporated in the boring drive system 206 which intermittently rotates the drill string 212 and the boring tool 202. In the system illustrated, the boring tool 202 has a slanted face 214 on its head 216 to which is attached a drill bit. Thus, as the boring tool 202 is pushed through the earth, it will go straight (in a spiral pattern) if it is continuously rotated. On the other hand, the boring tool 202 will veer in the direction of the slanted face 214 if it is pushed through the earth while not rotating. This system enables the operator to guide the direction of the boring tool 202. Many other steering systems are available, however, and this particular system is used for illustration only.

A detection module 218 in a beacon 220 is installed in the head 216 of the boring tool 202. A transmitter in the beacon 220 emits a signal by means of a radio frequency, telemetry, physical data link, or some other wireline or wireless system. Preferably, navigation information, such as pitch, roll, and compass direction, and strike avoidance information, such as total magnetic field and distance and rotation angle relative to an object, are carried by the signal and is displayed visually to the operator.

The control system 204 usually includes a control panel 222 by which the boring operation is controlled. The nature of the control 222 panel may vary widely depending on the type of drive system and steering system employed. In the jacking system 206 illustrated in FIG. 2, the control panel 222 allows the operator to add or remove joints of drill pipe to or from the drill string 212, to rotate the drill string 212 to advance and steer the boring tool 202, and generally to manage the boring operation.

The control panel 222 is associated with a receiver 224 by which the transmissions from the transmitter in the beacon 220 are received. In addition, an output device 226 is associated with the control panel 222.

The receiver 224 and the output device 226 may be integrated in the control panel 222 so that they are used by the same operator. Alternately, either one or both of the receiver 224 and the output device 226 may be separate, hand-held devices used by a second operator walking on the ground generally over the boring tool 202. In this embodiment, the second operator receives directional information with a combination receiver 224 and output device 226 which displays the directional information to the second operator. The second operator then communicates with the first operator at the control panel 222 by means of a radio, a data transmission device, or some like transmitter/receiver device. In any event, the first operator uses the directional information to make the necessary adjustments to the course of the boring tool.

For example, a tracker 228 may be used to determine the location, direction, and depth of the beacon 220 or to receive information from the detection module 218, such as navigation information and strike avoidance information. In addition, the tracker 228 may identify other signals that are radiated from underground objects, such as power lines. A tracker 228 typically provides digital signal processing for information received from the detection module 218, displays the processed information to an operator, and transmits the information, either processed or unprocessed, to the receiver 224 associated with the control panel 222.

While the particular boring assembly 200 shown in FIG. 2 uses a boring drive mechanism, the term "boring assembly" as used herein is intended to include all types of boring systems regardless of the nature of the drive mechanism. Similarly, the term "boring tool" as used herein includes a variety of permanent or replaceable boring heads, including stepped heads, splined heads, slanted heads, and blunt heads. The boring assembly may use any of a number of methods to assist with the boring, such as water assisted boring, compressed air assisted boring, and others. Similarly, other systems are known for steering a boring tool, such as offset pneumatic hammer mechanisms. Thus, "steering system" as used herein is intended to encompass all types of steering mechanisms.

Detection Module Measurements

Figure 3:
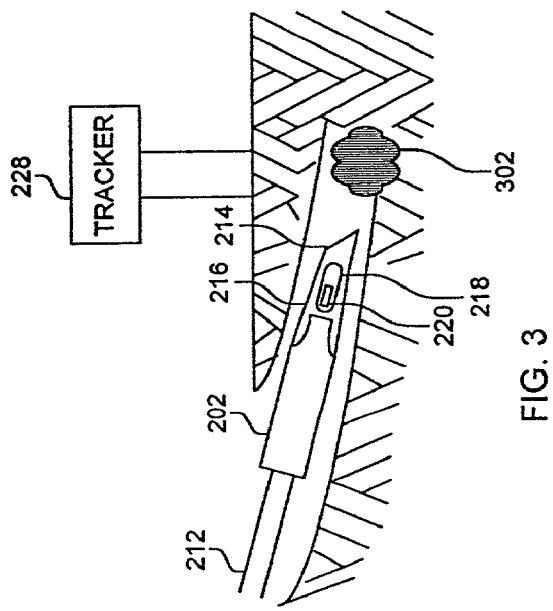
FIG. 3 is a diagrammatic view of a boring head assembly with a detection module sensing a passive magnetic field distortion.

FIG. 3 illustrates a version of the present invention in which the detection module 218 is adapted to detect an underground ferromagnetic object 302 and the orientation from the detection module to the object. The detection module 218 determines a magnetic field characteristic for the passive localized distortion of the earth's magnetic field that is produced by the underground ferromagnetic object 302. As explained more fully below, the detection module 218 uses one or more sensor assembly components to measure the three magnetic field components $H_X$, $H_Y$, and $H_Z$ during the boring operation.

Then, the total magnetic field H(T) is determined and compared to a reference value setpoint for the earth's magnetic field. If the two values differ by more than an allowed tolerance, an object 302 is within a designated distance from the detection module 218 and a strike of the object is possible. In one method, the total magnetic field H(T) is determined by computing the quadrature sum of the magnitudes of the three magnetic field components:

$$H(T)=\sqrt{H_X^2+H_Y^2+H_Z^2}. \qquad \text{EQ(1)}$$

However, it will be appreciated that another analysis which provides the same information may be used.

Figure 4:
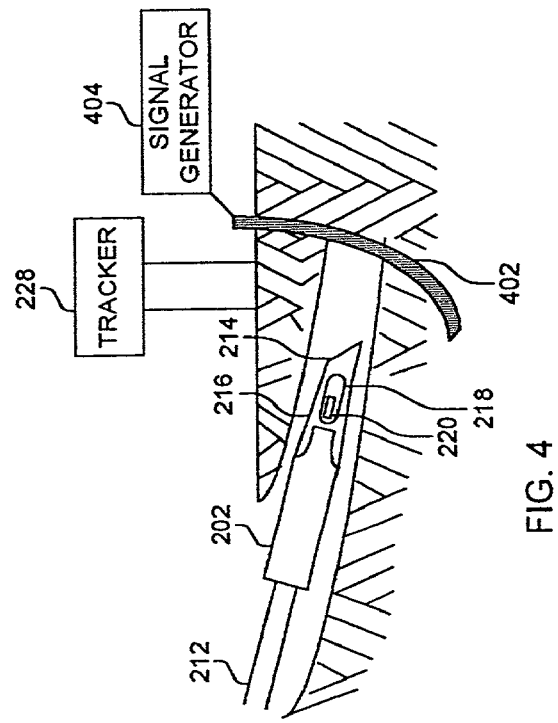
FIG. 4 is a diagrammatic view of a boring head assembly with a detection module sensing an impressed magnetic field.

FIG. 4 illustrates another version of the present invention in which the detection module 218 is adapted to detect a magnetic field characteristic for a signal which is impressed on an underground object 402. Such an object may be a utility line, such as a telecommunications line, a gas line, a pipe, or any other underground object.

Typically, a signal generator 404 is attached to, and impresses an alternating current (AC) signal on, the object 402. The impressed signal causes an active magnetic field to emanate from the object at a designated frequency. In addition, the signal generator 404 may sequentially impress a single signal on multiple utility lines or use coding techniques, such as using multiple operating frequencies, to impress simultaneous signals on multiple lines, such as in a common trench. A signal generator 404 typically may impress signals that are from less than 1 kilo-hertz (kHz) to 300 kHz with nominal outputs at approximately 1 kHz, 8 kHz, 29 kHz, 33 kHz, 34 kHz, 80 kHz, and 300 kHz. However, it will be appreciated that lower and higher frequencies may be used.

In addition, other underground objects such as power lines, telecommunications lines, or others may generate signals that produce alternating currents at various frequencies. These signals may produce active magnetic fields which can be detected by the detection module 218. For example, many telecommunications providers transmit signals over telecommunications lines at approximately 500 Hz. This 500 Hz signal can be detected by the detection module 218.

The detection module 218 determines the active magnetic field that is produced by a signal current that is impressed on the object 402. As explained more fully below, the detection module 218 uses one or more sensor assembly components to detect and measure the three magnetic field components $H_X$, $H_Y$, and $H_Z$. Then, the position orientation of the detection module 218 with respect to the object 402, including the distance (d) to the object and the direction for the angle of rotation (θ) to the object, can be determined.

Figure 6:
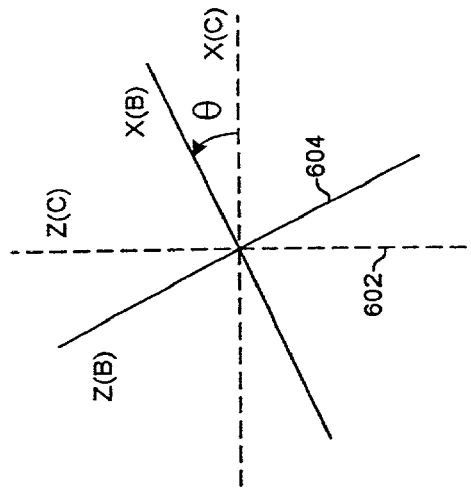
FIG. 6 is a coordinate diagram for a filament conductor and a beacon with a detection module having collinear y-axes and rotation.

With reference to FIGS. 4–6, an example of an analysis to determine the orientation of the detection module 218 with respect to the object 402 is illustrated. However, it will be appreciated that another analysis which provides the same information may be used.

As illustrated in FIG. 5, it may be assumed in this example that the object 402 is a filamentary conductor, such as a utility line, a telecommunications line, or another object on which a signal is impressed, thereby producing an active magnetic field, and that the conductor is collinear with the z-axis of a Cartesian coordinate system 502. A beacon 220 (FIG. 4) with a detection module 218 containing three orthogonal magnetic field sensor components defines another Cartesian coordinate system 504. For the purposes of the analysis, the y-axes of the two coordinate systems 502 and 504 are parallel. As illustrated below, the parallel y-axes assumption may be closely approximated by knowledge of the pitch position and the roll position of the beacon 220 with respect to reprojection of the coordinate systems 502 and 504.

Coordinate axes reprojection is used to place sensor data in a consistent horizontal reference plane to remove effects of angular influence from the measured magnetic field component data. When the detection module is situated in a plane that is normal to the gravity vector of the earth, the coordinate axes do not have to be reprojected because the data from the magnetic sensor assembly represents accurate magnetic field component data for a horizontal plane. However, when the detection module is at some pitch angle or roll angle, the data from the magnetic sensor assembly is influenced by the roll and/or pitch angle and may not represent the true magnitude of the magnetic field components in a horizontal reference plane.

To compensate for any influence associated with inclination or roll, the system of the present invention reprojects the magnetic field component data to a consistent reference plane. To accomplish the reprojection, the detection module measures the magnetic field components and any pitch angle or roll angle using a magnetic sensor assembly, a pitch sensor assembly, and a roll sensor, respectively. The system uses the pitch angle data and the roll angle data to compensate for pitch and roll effects in the magnetic field component measurements and to place the magnetic field component data in a consistent horizontal reference plane.

For example, in one method of reprojection, correction for a nonzero pitch angle and a nonzero roll angle can be completed iteratively. After the magnetic field components, the roll angle γ, and the pitch angle φ have been measured with the sensor assemblies, the following determinations may be made for intermediate magnetic field components $H_X'$, $H_Y'$, and $H_Z'$ for measured magnetic field components $H_X''$, $H_Y''$, and $H_Z''$ and for the measured pitch angle φ where the roll angle γ is known and consistent:

$$H_X' = H_X'', \quad \text{EQ(2)}$$

$$H_Y' = H_Y'' \cos\phi - H_Z'' \sin\phi, \text{ and} \quad \text{EQ(3)}$$

$$H_Z' = H_Y'' \sin\phi + H_Z'' \cos\phi. \quad \text{EQ(4)}$$

Then, using the determinations above, and knowing the consistent pitch angle φ, the next iteration can be made to determine the final magnetic field components $H_X$, $H_Y$, and $H_Z$ for the coordinate reprojection for the measured roll angle γ where the pitch angle φ is known and consistent:

$$H_X = H_X' \cos\gamma - H_Z' \sin\gamma, \quad \text{EQ(5)}$$

$$H_Y = H_Y', \text{ and} \quad \text{EQ(6)}$$

$$H_Z = H_X' \sin\gamma + H_Z' \cos\gamma. \quad \text{EQ(7)}$$

It will be appreciated that the iterations may be completed in any order. Thus, the determinations may be made as above or by first determining the value for the coordinate axes based on a consistent pitch angle and then determining the values for the coordinate axes based on a consistent roll angle. In addition, in some instances, it may be necessary only to compute one iteration, either for the measured roll angle or for the measured pitch angle but not both, as when the apparatus is designed to take field measurements at zero roll angle. One system and method of reprojecting the coordinate axes of a detection module and an electronic compass associated therewith is described in copending U.S. patent application Ser. No. 08/544,940, entitled "Electronic Compass," which is incorporated herein by reference.

The relative orientation of the beacon 220 with respect to the conductor can be obtained by coordinate rotation between the two systems. The magnetic field produced by an infinite current-carrying conductor does not have a field component along the axis of the conductor $z_C$, so that $$\overline{H}(T) = H_X \overline{a}_X + H_Y \overline{a}_Y. \quad \text{EQ(8)}$$

The field produced by unit current is the following:

$$\overline{H}(T) = \frac{-y}{2\pi(x^2+y^2)}\overline{a}_X + \frac{x}{2\pi(x^2+y^2)}\overline{a}_Y. \quad \text{EQ(9)}$$

A generalized magnetic field sensor component set in conductor coordinates will produce the following result:

$$\overline{S}(T) = \overline{k}\overline{S} = S_X \overline{a}_X + S_Y \overline{a}_Y + S_Z \overline{a}_Z = k_X H_X \overline{a}_X + k_Y H_Y \overline{a}_Y + k_Z H_Z \overline{a}_Z \quad \text{EQ(10)}$$

where $k_i$ is a constant of proportionality which has a scale factor for the source amplitude of the magnetic field which normalizes the sensitivities of the individual sensor components. $S_i$ represents the sensor signal magnitudes.

Where calibration of the production hardware in the detection module 218 of the beacon 220 normalizes the responses of the sensor components, then $$k_X = k_Y = k_Z = k \quad \text{EQ(11)}$$

which implies $$S_X = k_X H_X = kH_X,$$

$$S_Y = k_Y H_Y = kH_Y, \text{ and}$$

$$S_Z = k_Z H_Z = kH_Z. \quad \text{EQ(12)}$$

If a set of sensor readings $S_i$ are taken near a filamentary conductor, then the location of the conductor in the x-y plane that corresponds to the given measurement set can be determined. By combining EQ(8) and EQ(9), the following relationships are identified:

$$S_X = kH_X = \frac{-ky}{2\pi(x^2+y^2)}, \qquad \text{EQ(13)}$$

$$S_Y = kH_Y = \frac{-kx}{2\pi(x^2+y^2)}, \text{ and} \qquad \text{EQ(14)}$$

$$S_Z = kH_Z = 0. \qquad \text{EQ(15)}$$

By observing that the denominators of EQ(13) and EQ(14) are identical, the following relationship is obtained:

$$2\pi(x^2+y^2) = \frac{-ky}{S_X} = \frac{-kx}{S_Y}. \qquad \text{EQ(16)}$$

Therefore, we have $$x = -\frac{S_Y}{S_X} y. \qquad \text{EQ(17)}$$

Substitution of EQ(17) into EQ(14) leads to the result:

$$y = \frac{-kS_X}{2\pi(S_X^2 + S_Y^2)} \text{ and} \qquad \text{EQ(18)}$$

$$x = \frac{kS_Y}{2\pi(S_X^2 + S_Y^2)}. \qquad \text{EQ(19)}$$

These magnetic field component data readings correspond to unit vectors in the conductor coordinate system 502.

The y-axes of the two coordinate systems 502 and 504 are parallel when the magnetic field component data of the beacon 220 is reprojected to a consistent horizontal reference plane with the conductor. When the y-axes of the two coordinate systems 502 and 504 are parallel, the y-axes magnetic field component readings in both coordinate systems will be the same.

The two coordinate systems 502 and 504 are related by a coordinate system rotation when the y-axes of the two coordinate systems are parallel. After rotation, the two coordinate systems 502 and 504 simplify to two-dimensional coordinate systems 602 and 604 for the conductor and beacon, respectively, as illustrated in FIG. 6.

Next, the measurements from the beacon coordinate system 604 are transformed to the conductor coordinate system 602 by using the following relationship:

$$(x_C, y_C, z_C) = T(x_B, y_B, z_B) \qquad \text{EQ(20)}$$

where the subscripts C and B are used to denote the conductor and beacon detection module coordinate systems 602 and 604, respectively.

A rotation angle $\theta$ is measured from the $x_B$ axis to the $x_C$ axis. It is assumed that $\theta$ is positive when the rotation is counter-clockwise. The appropriate transform may be given by the following relationships:

$$x_C = x_B \cos\theta + z_B \sin\theta \text{ and} \qquad \text{EQ(21)}$$

$$z_C = -x_B \sin\theta + z_B \cos\theta. \qquad \text{EQ(22)}$$

In the case of the infinite current-carrying conductor, the z-axis component is identically zero in the conductor coordinate system 602. In general, the z-axis component of the detection module coordinate system 604 is non-zero because the rotation angle $\theta$ is non-zero. However, the rotation angle $\theta$ may be solved by forcing the condition that $z_F = 0$. Therefore, $$0 = -x_B \sin\theta + z_B \cos\theta \text{ and} \qquad \text{EQ(23)}$$

$$\theta = \tan^{-1}\frac{z_B}{x_B}. \qquad \text{EQ(24)}$$

Once the rotation angle $\theta$ is known, the transform relationships in EQ(21) and EQ(23) are used to convert the magnetic field component readings from the beacon coordinate system 604 to the conductor coordinate system 602. The final transform set is the following:

$$S_{XC} = S_{XB} \cos\theta + S_{ZB} \sin\theta, \qquad \text{EQ(25)}$$

$$S_{YC} = S_{YB}, \text{ and} \qquad \text{EQ(26)}$$

$$S_{ZC} = -S_{XB} \sin\theta + S_{ZB} \cos\theta. \qquad \text{EQ(27)}$$

The solution to EQ(27) is zero if the rotation angle $\theta$ has been determined correctly. Then, the results from EQ(25) and EQ(26) are applied to EQ(18) and EQ(19). Once the x and y coordinates in the conductor coordinate system 602 are known, and supposing knowledge of constant of proportionality (k), the distance (d) separating the beacon 220 having the detection module 218 and the conductor is obtained by the following relationship:

$$d = \frac{k}{2\pi\sqrt{S_{XC}^2 + S_{YC}^2}}. \qquad \text{EQ(28)}$$

The distance d and the rotation angle $\theta$ then are used to determine if the beacon 220 with the detection module 218 is approaching, paralleling, or departing a conductor. If $\theta=0$, the beacon 220 is paralleling the conductor. If $\theta>0$, the beacon 220 is approaching the conductor. If $\theta<0$, the beacon 220 is departing the conductor. It will be appreciated that the previous analysis and the following descriptions apply equally to a detection module in any trenching or trenchless assembly.

It will be appreciated that the rotation angle $\theta$ is not an incremental correction angle that is based on a prior or original measurement and computation. Instead, the rotation angle is determined independent of prior measurements and prior determinations, and a new determination is made for each sensor measurement. This eliminates the possibility of an error that may occur in the determination of prior measurements of rotation angles from being carried through to succeeding determinations with that error existing or increasing with each iteration of the correction angle. Thus, there is no cumulative error. Similarly, the distance determination is not an incremental correction. Thus, the present system is a great advance over prior systems.

In addition, the present system does not rely on detecting magnetic fields that are assumed to be monopole fields. The present system processes data to determine orientation with respect to an object emanating any type of magnetic field, including monopole fields, dipole fields, and other fields.

It will be appreciated that the constant of proportionality $k_i$ can be determined in a calibration process. One example of such a calibration can be completed by placing the detection module on the ground a designated and known distance from an object which has a magnetic field characteristic. A measurement of the magnetic field can be taken and EQ(28) can be used to determine the constant of proportionality for that device. Other methods may be used to determine the constant of proportionality In some instances, the signal current for an active magnetic field on an impressed line will decline as the distance between the detection module and the object increases. This decline can be assumed to be either linear or exponential. A correction factor may be determined by taking a second reading at a second designated distance and comparing the two readings for a specified impressed line. Other methods may be used to determine the correction factor.

Closed Loop Control

The systems of FIGS. 2 and 4 may be used to implement a closed loop control of the boring tool 202. For example, the object 402 may be a current-carrying conductor line that is stretched across the ground along an intended bore path. An electric current-carrying signal may be impressed on the object 402 by the signal generator 404. The detection module 218 detects the orientation of the boring tool 202 with respect to the object 402 during the boring operation. The orientation information is transmitted to the receiver 224 and then to the console 222. The console 222 then uses the orientation information to automatically manipulate the boring tool 202 to maintain a desired orientation during the boring operation with respect to the surface object 402.

System Components

Figure 7:
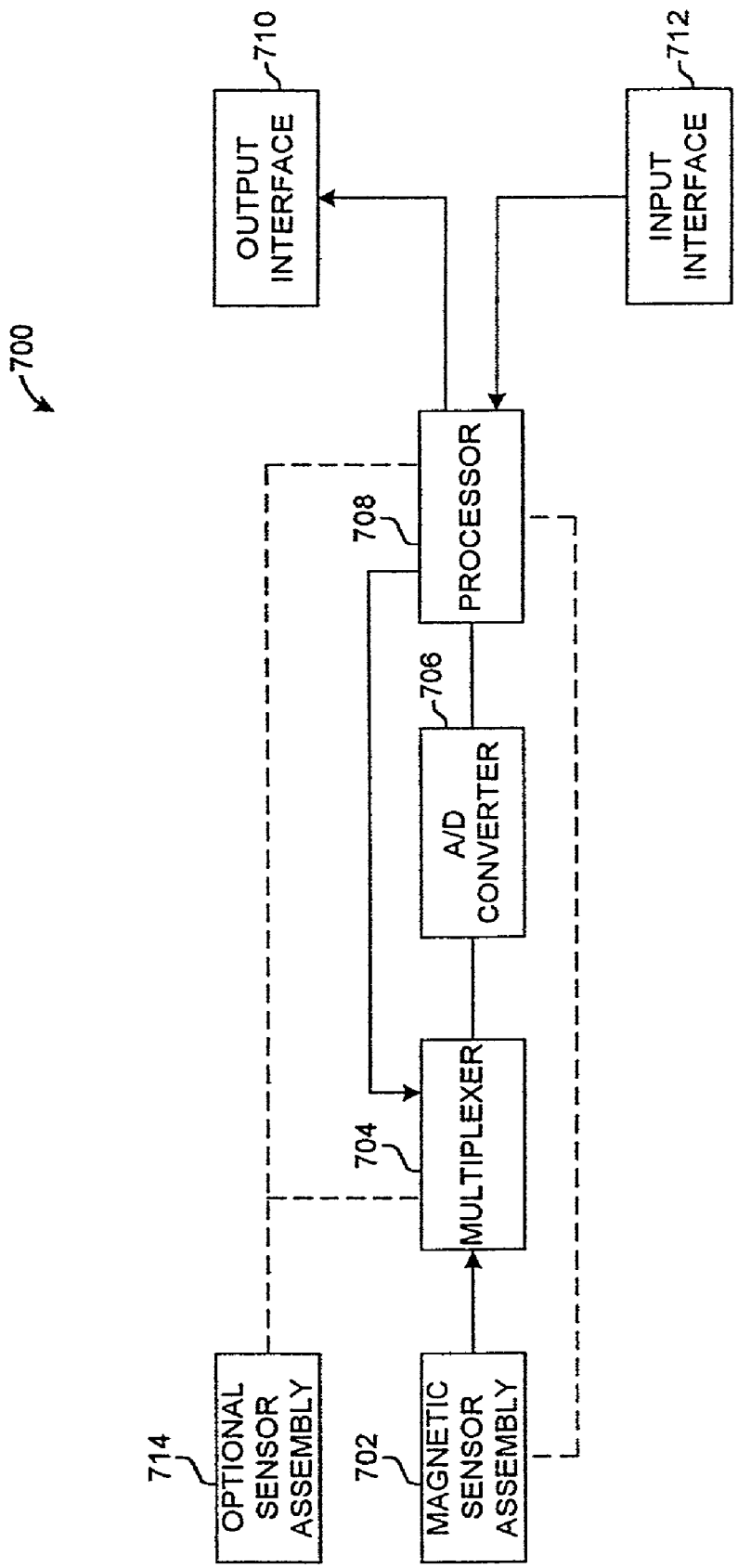
FIG. 7 is a block diagram of a version of a circuit for sensing and processing magnetic field information in accordance with the present invention.

FIG. 7 illustrates a version of the detection module 700 of the present invention. The detection module 700 comprises a magnetic sensor assembly 702, a multiplexer 704, an analog/digital (A/D) converter 706, and a processor 708. In addition, the detection module 700 comprises an output interface 710 and an input interface 712. Also, the detection module 700 may have an optional sensor assembly 714.

The magnetic sensor assembly 702 detects the magnetic field components $H_x$, $H_y$, and $H_z$ for the x, y, and z axes, respectively, for a magnetic field and produces one or more sensor signals in response thereto that contain data for the magnetic field components. The magnetic sensor assembly 702 detects magnetic field components that are indicative of magnetic field characteristics of either a passive magnetic field distortion, an impressed active magnetic field, or both. The magnetic sensor assembly 702 provides any required amplification of the signal or conditioning of the signal.

In some instances, the magnetic sensor assembly 702 has an optional set/reset component (not shown), such as one or more coils that can be pulsed with a high-intensity current. The set/reset component is used to set the polarity of the magnetic sensor assembly 702 and to place the orientation of the magnetic sensor assembly in a known magnetic state. In addition, the set/reset component may be pulsed to remove offset errors in the readings from the magnetic sensor assembly 702. Typically, the processor 708 sends a control signal over an optional connection to set or reset the set/reset component.

The multiplexer 704 multiplexes signals from the magnetic sensor assembly 702 and the optional sensor assembly 714, if required, and transfers the signals to the A/D converter 706. The multiplexer 704 has a plurality of input channels from the magnetic sensor assembly 702 and the optional sensor assembly 714 and an output channel to the A/D converter 706. The processor 708 controls which input channel is connected to the output channel by sending a control signal to the multiplexer designating the required input channel to be connected.

The A/D converter 706 accepts analog signals from the multiplexer 704, converts the signals to digital signals, and transfers the digital signals to the processor 708. In some instances, the processor 708 may control the start and end of the conversion process in the A/D converter 706.

The processor 708 receives the sensor signals that represent magnetic field component data. The processor 708 processes the magnetic field component data to determine the magnetic field composite data and transmits the composite data as process data in an output signal to a receiver through the output interface 710. For example, the processor 708 may use the analysis described above to determine the total magnetic field to determine a position of an object with a passive magnetic field distortion or it may determine the position orientation, including the distance and/or rotation angle, to an object with an impressed active magnetic field. Alternately, the processor 708 may transmit the magnetic field component data for $H_x$, $H_y$, and $H_z$ to a receiver without processing them. As used herein, "composite data" means information and data from the sensor assemblies 702 and 714 after it has been processed by the processor 708, including one or more of the total magnetic field, distance, rotation angle, and/or any other orientation or navigational data, such as compass data for azimuth. The term "component data" means information and data from the sensor assemblies 702 and 714 that has not been processed by the processor 708. The term "process data" means composite data and/or component data and/or navigation or other strike avoidance data from the sensors that has been processed and/or transmitted by the processor 708.

In addition, the processor 708 may determine the composite data by completing pattern matching algorithms to reconstruct waveforms without using calculations. This is a process of moving a template of data points of signal time samples over known waveforms to determine a match.

The processor 708 controls the magnetic sensor assembly 702, if required, the multiplexer 704, the A/D converter 706, if required, and the output interface 710, if required. The processor 708 also accepts data from any sensors in the optional sensor assembly 714 and processes and transfers the data as process data, as required. In addition, the processor 708 accepts data from the input interface 712, such as programming or control data that is used to transmit information out of the output interface 710 or to calibrate or control any of the components in the detection module 700.

The output interface 710 transfers data out of the detection module 700. The output interface 710 may be a data link interface to a physical data line, a magnetic field transmitter, or a wireless telemetry transmitter. For example, the output interface 710 may transmit data using amplitude modulation of the signal, frequency modulation, pulse width modulation, and others. Preferably, the output interface 710 is a tank that transmits data using a keyed single frequency of about 29 kHz. The output interface 710 typically is controlled by the processor 708.

The input interface 712 accepts data from a device external to the detection module 700 and transfers the data to the processor 708. For example, the input interface 712 may be a serial interface used to transfer configuration information or calibration information from a computer. Also, the input interface 712 may accept navigational control information to control the orientation, direction, and speed of the boring tool 202 (FIG. 2).

The optional sensor assembly 714 comprises other sensors or sensor assemblies that provide navigational information, environmental information, or other processing information to the processor 708. For example, the optional sensor assembly 714 may comprise a temperature sensor, a roll sensor, a pitch sensor, or a compass sensor. The optional sensor assembly 714 may be connected to either the multiplexer 704, to the processor 708, or to both the multiplexer and the processor, depending on the components in the optional sensor assembly.

The detection module 700 of FIG. 7 operates as follows when the detection module in a boring tool detects a passive magnetic field distortion. Prior to the boring operation, a reference value setpoint is determined for the earth's magnetic field in an area known to be unaffected by underground objects by reading the magnetic sensor assembly 702 and computing a reference value for the total magnetic field. This reference value is a constant which is retained as a setpoint to be used in a comparison to the total magnetic field which is computed during the boring operation.

The setpoint is stored in the processor 708 during calibration of the detection module 700. In addition, the processor 708 sets the polarity of the magnetic sensor assembly 702, thereby placing the orientation of the magnetic sensor assembly in a known magnetic state.

During the boring operation, the magnetic sensor assembly 702 detects the magnetic field components $H_X$, $H_Y$, and $H_Z$ for a passive magnetic field. The processor 708 sends a control signal to the multiplexer 704 so that the multiplexer will connect each input channel carrying a sensor signal containing the magnetic field component data from the magnetic sensor assembly 702 one-by-one to the output of the multiplexer 704. Each of the signals is transferred to the A/D converter 706 where it is converted to a digital signal and passed to the processor 708.

The processor 708 continuously accepts sensor signals from the magnetic sensor assembly 702, computes the total magnetic field H(T) to determine the orientation, and continuously compares the computed total magnetic field to the predetermined setpoint. If the total magnetic field departs from the setpoint by more than a designated tolerance, then the out-of-tolerance condition is indicative of a possible impending strike of an underground object 302 (FIG. 3). A bipolar tolerance may be used. Thus, a strike of an underground object 302 by a beacon with the detection module 700 is possible where the absolute value of the variance magnitude between the computed total magnetic field and the setpoint is greater than the designated tolerance. A strike is more possible as the magnitude of the variance increases.

In this example, the processor 708 transfers an output signal having the value of the total magnetic field as the process data to the output interface 710, regardless of whether a strike is or is not possible. The output interface 710 transmits the output signal to a receiver 224 (FIG. 2) via a magnetic field transmission using a single keyed frequency of approximately 29 kHz. The receiver 224 may display the total magnetic field information to the operator, or the receiver merely may provide a warning at the control panel 222 (FIG. 2), via a light or an alarm, to the operator when a strike of an object 302 is possible. It will be appreciated that the comparison of the total magnetic field to the setpoint may be completed by the receiver or by another processor device in other examples.

In another example, the detection module 700 of FIG. 7 operates as follows when the detection module detects an impressed active magnetic field. Prior to the boring operation, the processor 708 sets the polarity of the magnetic sensor assembly 702, thereby placing the orientation of the magnetic sensor assembly in a known magnetic state. In addition, a utility line object 402 to be avoided is impressed with, for example, a 1 kHz signal using a signal generator 404 (see FIG. 4).

During the boring operation, the magnetic sensor assembly 702 detects the magnetic field components $H_X$, $H_Y$, and $H_Z$ for an active magnetic field caused by an object 402 that has an impressed signal. The magnetic sensor assembly 702 generates a sensor signal with magnetic field component data for each magnetic field component that is detected.

The processor 708 sends a control signal to the multiplexer 704 so that the multiplexer will connect each input channel carrying the sensor signals from the magnetic sensor assembly 702 to the multiplexer, one-by-one, to the output of the multiplexer 704. Each of the signals is transferred to the A/D converter 706 where it is converted to a digital signal and passed to the processor 708.

In this example, the processor 708 continuously accepts sensor signals from the magnetic sensor assembly 702, reprojects the data for the magnetic field components to a consistent horizontal reference plane, and computes the orientation of the detection module 700 with respect to the active magnetic field by determining the distance and rotation angle to the object 402. The processor 708 transfers an output signal having the values of the distance and rotation angle as the process data to the output interface 710. The output interface 710 transmits the output signal to a receiver 224 (FIG. 2) via a telemetry transmission. The receiver 224 may display the distance and rotation angle to the operator at the control panel 222 (FIG. 2), or the receiver may provide a warning, via a light or an alarm, to the operator when a strike of the object 402 is possible.

It will be appreciated that the processor 708 also can transmit the magnetic field component data as the process data in an output signal through the output interface 710 without computing the distance and rotation angle. In addition, in another example, the detection module 700 may determine if a frequency response at a certain frequency or within a band of frequencies is detected. In such a case, in response to detecting one or more frequencies having a high magnetic field magnitude, the detection module 700 may signal the receiver 224 (FIG. 2) to stop the boring operation. Alternately, the processor 708 may transfer the information having the detected frequencies as the process data in an output signal through the output interface 710 to the receiver 224. The receiver 224 then may either display the information or stop the boring operation if a strike is possible.

Figure 8:
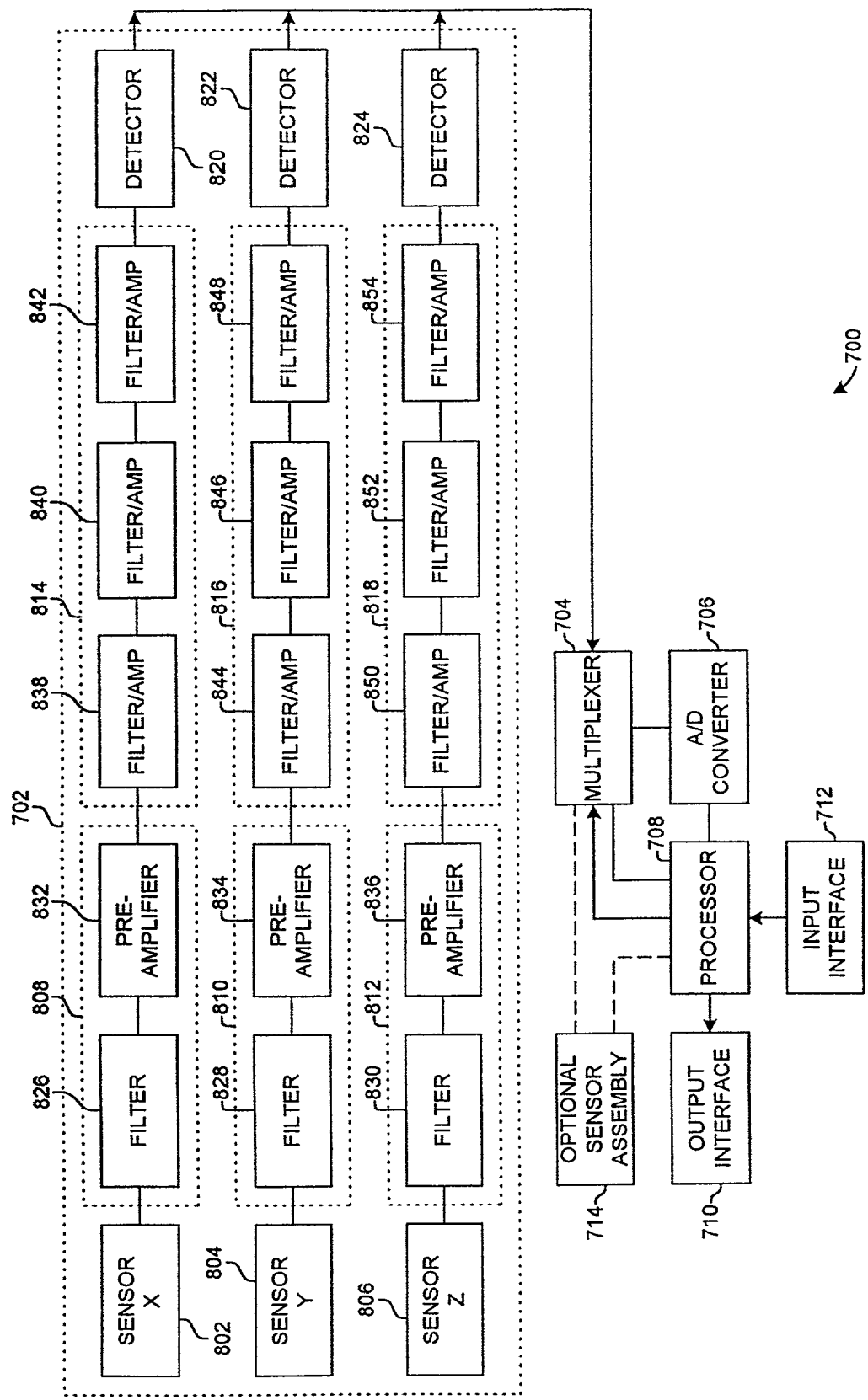
FIG. 8 is a block diagram of a version of the magnetic field sensor assembly of FIG. 7.

FIG. 8 illustrates a version of a magnetic sensor assembly 702 for use in the detection module 700. The magnetic sensor assembly 702 comprises one or more magnetic field sensors 802, 804, and 806. Each magnetic field sensor 802, 804, and 806 is connected to a filter/preamplifier assembly 808, 810, and 812, a filter/amplifier assembly 814, 816, and 818, and a detector 820, 822, and 824, respectively.

The magnetic field sensors 802, 804, and 806 are the x, y, and z sensors that detect the magnetic field for the $H_X$, $H_Y$, and $H_Z$ components. The magnetic field sensors 802, 804, and 806 each produce a voltage sensor signal in response to detecting the magnetic field components that are collinear with the sensitive axis of that magnetic field sensor. One of the magnetic field sensors 802, 804, and 806, preferably the z-axis magnetic field sensor, is mounted on a circuit board with its sensitive axis collinear with the longitudinal axis of the detection module 700, and the other magnetic field sensors are mounted so that their sensitive axes are orthogonal thereto and to each other.

The magnetic field sensors 802, 804, and 806 may be packaged as a single tri-axial magnetic field sensor, a dual-axis magnetic field sensor and a single-axis magnetic field sensor, or three single-axis magnetic field sensors. Preferably, the magnetic field sensors 802, 804, and 806 comprise a single-axis magnetoresistive sensor and a dual-axis magnetoresistive sensor, both of which are manufactured by Honeywell. The dual-axis magnetoresistive sensor provides the advantage of having two orthogonal sensors on the same die. This allows for easier manufacture and calibration.

The filter/preamplifier assemblies 808, 810, and 812 each comprise a filter 826, 828, and 830 and a preamplifier 832, 834, and 836. The filters 826, 828, and 830 are used to reject noise and other unwanted components from the sensor signals. High-pass filters are used to reject direct current (DC) and low-frequency AC noise. The preamplifiers 832, 834, and 836 amplify the signals received from the filters for a higher gain. A 60 decibel-volt (dBV) gain is optimal.

The filter/amplifier assemblies 814, 816, and 818 each have three filter/amplifiers 838, 840, and 842, 844, 846, and 848, 850, 852, and 854. Each of the filter/amplifiers 838–854 accentuate or remove certain spectral components from the signals and amplify the signals for a higher gain. An optimal pass-band gain for each filter/amplifier 838–854 is 20 dBV.

When the detection module 700 detects passive magnetic field distortions that are to be processed, the filters in the filter/amplifiers 838–854 are lowpass filters that filter out signal components above a designated frequency. The lowpass filter can be either an analog filter or a digital filter. For example, digital filters may be finite impulse response (FIR) filters that use a weighted average of samples or infinite impulse response (IIR) filters that use continuous averaging. In addition, a simple average method may be used to digitally filter the data. The simple average reduces the noise by the square root of the number of samples taken. The simple average is the preferred lowpass digital filtering method.

When the detection module 700 detects active magnetic fields that are to be processed, the filters in the filter/amplifiers 838–854 are bandpass filters that filter out signal components that are not within the designated frequency band of the filter. When transmitters are used as the signal generator to impress, for example, either 1 kHz or 8 kHz signals on a conductor, the center frequencies of the bandpass filters are 1 kHz or 8 kHz, respectively.

The detectors 820, 822, and 824 extract particular characteristics of a sensor signal, such as sampled data at discrete intervals, and pass these characteristics to the A/D converter 706 through the multiplexer 704. The detectors 820, 822, and 824 may be peak detectors that present peak values of the AC waveform signal components. In addition, the detectors 820, 822, and 824 may be sampled-data systems, such as simple average sampling systems or continuous moving average sampling systems that present the average value of the magnitude of the sensor signal components. The sampled-data system is preferred, although a peak detector is easier to implement.

The magnetic sensor assembly 702 of FIG. 8 operates as follows. The x-axis magnetic field sensor 802 detects the $H_X$ component of the magnetic field. The y-axis magnetic field sensor 804 detects the $H_Y$ component of the magnetic field. The z-axis magnetic field sensor 806 detects the $H_Z$ component of the magnetic field. Each of the magnetic field sensors 802, 804, and 806 transfer sensor signals having magnetic field component data to the filters 826, 828, and 830. Noise is filtered from the sensor signals by the filters 826, 828, and 830, and the preamplifiers 832, 834, and 836 raise the gain of each sensor signal by 60 dBV.

The filter/amplifiers 838–854 each raise the gain of each sensor signal by another 20 dBV, for a total of 60 dBV, filter out additional unwanted noise, and allow a designated bandwidth of the sensor signals to pass to the detectors 820, 822, and 824. The detectors 820, 822, and 824 sample the signals and provide a sampled-data simple average of each sensor signal to the processor 708 via the multiplexer 704 and the A/D converter 706 for processing, as explained above. It will be appreciated that the total gain applied to each sensor signal in this example is 120 dBV.

Figure 9:
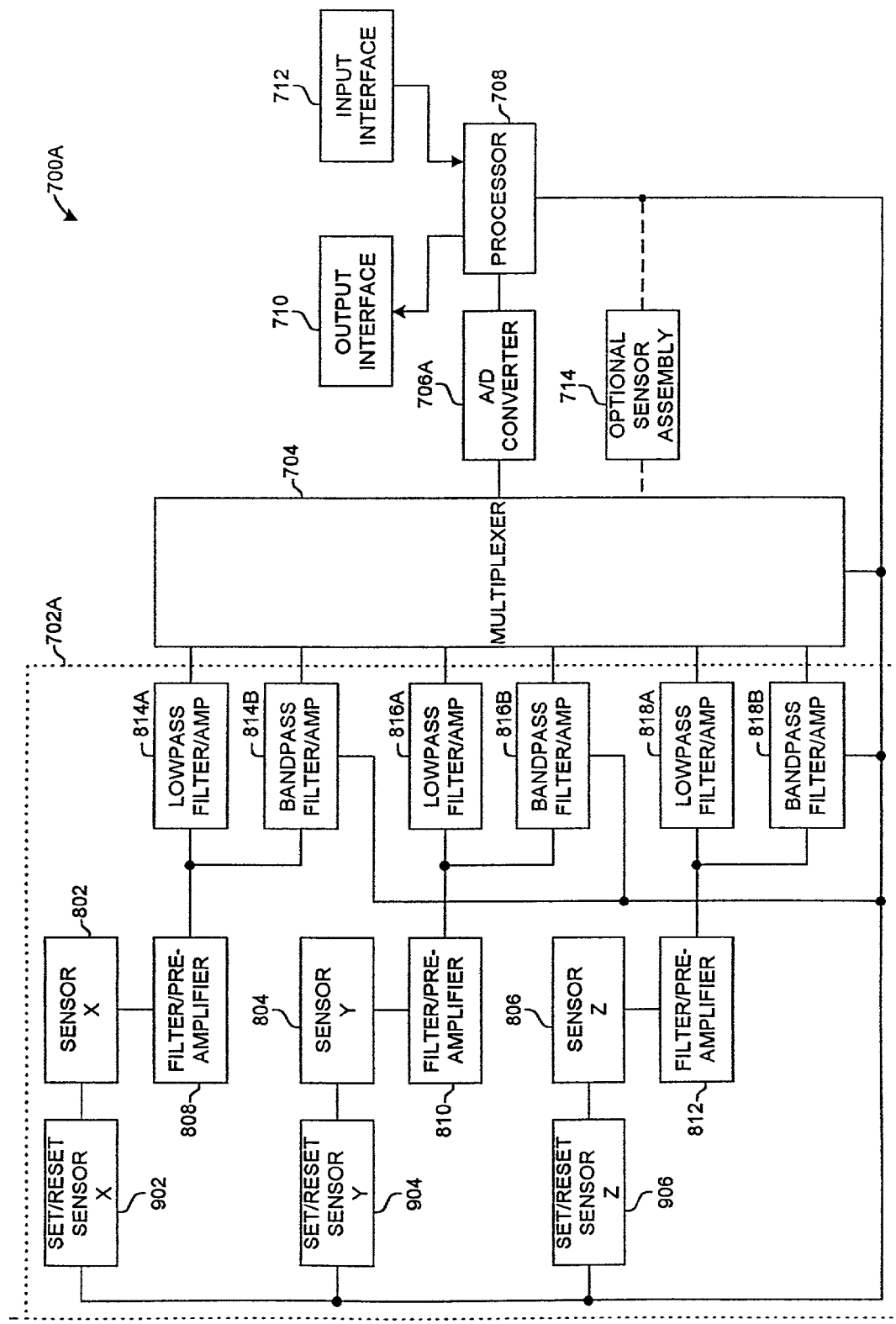
FIG. 9 is a block diagram of a version of the magnetic field sensor assembly of FIG. 7 with passive and active magnetic field sensing.

FIG. 9 illustrates another configuration for a magnetic sensor assembly 702A. The magnetic sensor assembly 702A has the same magnetic field sensors 802, 804, and 806 and filter/preamplifier assemblies 808, 810, and 812 as those components in FIG. 8. However, each filter/preamplifier 808, 810, and 812 is connected to both a lowpass filter/amplifier (amp) assembly 814A, 816A, and 818A and a bandpass filter/amplifier (amp) assembly 814B, 816B, and 818B. These are the same lowpass filters and bandpass filters as described above. In addition, each magnetic field sensor 802, 804, and 806 is connected to a set/reset element 902, 904, and 906.

The set/reset elements 902, 904, and 906 are used to flip the fields of the polarities of the magnetic field sensors 802, 804, and 806. Field flipping is used to align the magnetic field sensors 802, 804, and 806 to a designated polarity and to control offset errors. The field flipping is controlled by the processor 708. Thus, when the set/reset elements 902, 904, and 906 are to be set or reset, the processor 708 causes a short high-intensity current from a power source (not shown) to be pulsed to the set/reset elements 902, 904, and 906.

In addition, because the magnetic sensor assembly 702A has both the lowpass filter/amp assemblies 814A–818A and the bandpass filter/amp assemblies 814B–818B, both AC and DC magnetic field information can be passed from a single magnetic field sampling of the magnetic field sensors 802, 804, and 806 to the processor 708 for processing. This allows the detection module 700A to process total magnetic field information, distance, and direction at the same time, thereby detecting passive and active magnetic fields at the same time.

Moreover, the bandpass filter/amps 814B, 816B, and 818B are under the control of the processor 708. This allows the processor 708 to select and control a variable bandpass for various frequencies at various times. For example, the processor 708 may select between a 1 kHz center frequency bandpass and an 8 kHz center frequency bandpass.

Also, the detection module 700A of FIG. 9 uses the A/D converter 706A to provide the detection function of the circuit. Thus, instead of using a peak detector or external data-sampler, the A/D converter 706A is a multi-channel A/D converter which samples the analog waveform from the sensor signals. The A/D converter 706A uses digital filtering and provides phase and magnitude information to the processor 708. This improves signal processing by the processor 708 on the lower end of the sensor signal magnitude range and therefore extends the operative range that an object may be detected from the detection module 700A.

In addition, magnetic field information regarding navigation of the detection module 700A is collected using the magnetic field sensors 802, 804, and 806. The DC components of the magnetic field also may be used and processed in the processor 708 to determine navigation information for an electronic compass function by using the reprojected magnetic field component data as explained above. Thus, the configuration of FIG. 9 provides a dual role of providing object strike avoidance information and navigation information.

Figure 10:
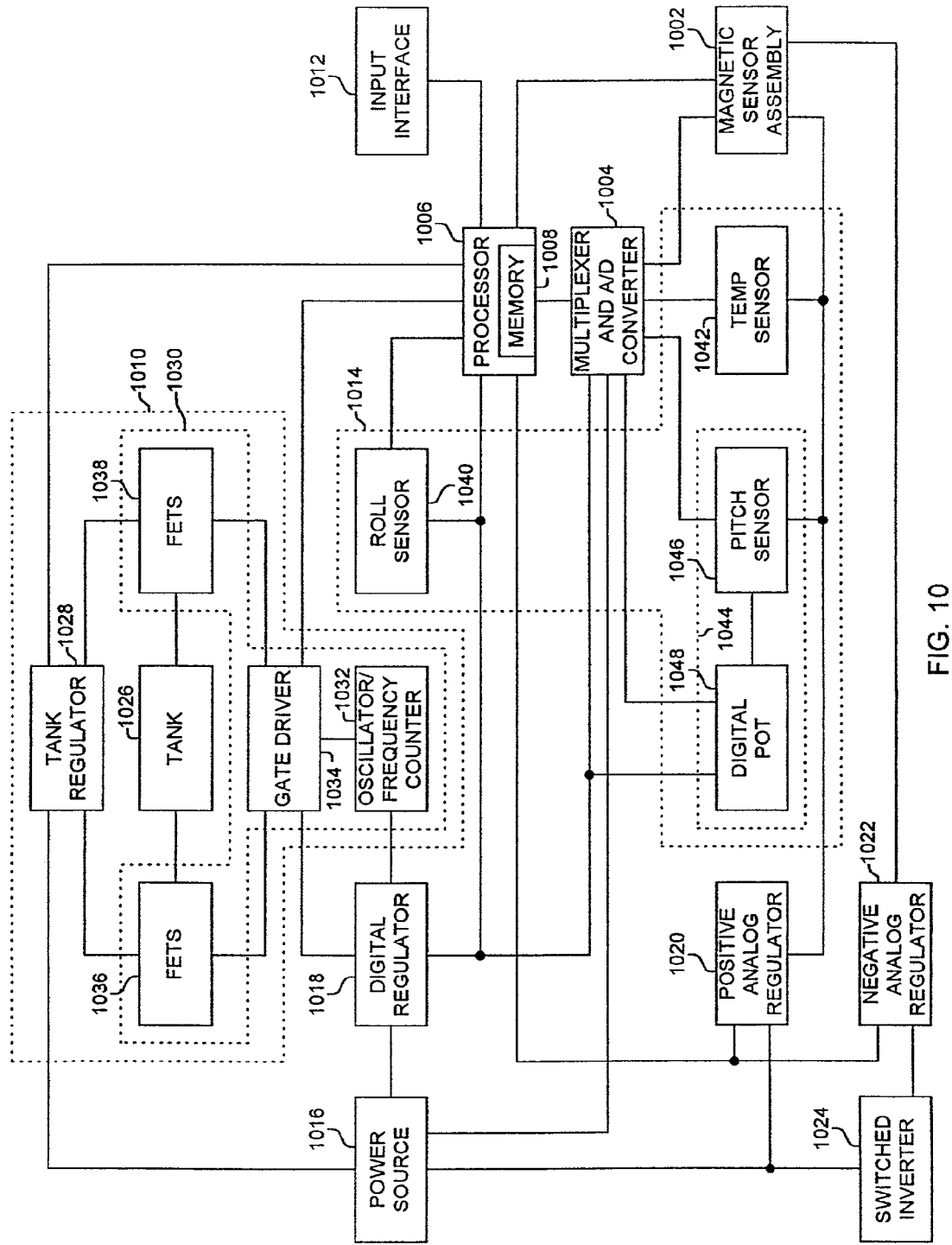
FIG. 10 is a block diagram of a version of an electronics circuit board in a detection module in accordance with the present invention.

FIG. 10 illustrates a version of a sensor board with electronic components used in a detection module 1000. The detection module 1000 comprises a magnetic sensor assembly 1002, a multiplexer with a built in A/D converter (mux/converter) 1004, a processor 1006 having memory 1008 to store volatile and nonvolatile programming and data, an output interface 1010, an input interface 1012, and an optional sensor assembly 1014. In addition, the detection module 1000 comprises a power source 1016, a digital regulator 1018, a positive analog regulator 1020, a negative analog regulator 1022, and a switched inverter 1024.

The magnetic sensor assembly 1002, the mux/converter 1004, the processor 1006, the output interface 1010, the input interface 1012, and the optional sensor assembly 1014 are the same as the components described above, unless noted below. Although the magnetic sensor assembly 1002 may be any magnetic sensor assembly described herein, preferably the magnetic sensor assembly 702A of FIG. 9 is used in this detection module 1000. Also, the A/D converter 706A of FIG. 9 is combined with the multiplexer 704 of FIG. 9 on a single chip in this detection module 1000.

The processor 1006 has several functions in addition to the functions of the processor 708 of FIG. 9. The processor 1006 receives pitch data and processes the pitch data to determine the pitch angle of the boring tool 202. The processor 1006 also receives temperature data to determine the temperature of the detection module 1000 and its associated components so that the temperature may be used for temperature compensation. The processor 1006 receives roll data and determines the roll angle. In addition, the processor reads the power level in the power source 1016 and provides a power level percentage in the process data of the output signal. As described more fully below, the processor 1006 may place system components in a "sleep" state so that the components are not running and are drawing minimal power.

The power source 1016 produces DC power to the digital and analog components of the detection module 1000. The power source 1016 may use a 6 volt lithium series battery stack to produce the power.

The digital regulator 1018 provides a fixed voltage to the digital components of the detection module 1000, preferably 5 volts. The digital regulator 1018 is always in the "on" state.

The positive analog regulator 1020 provides a fixed positive voltage to the analog components of the detection module 1000, preferably positive 5 volts. The positive analog regulator 1020 is not always in the "on" state. The processor 1006 may place the positive analog regulator 1020 in a "sleep" state to conserve power when the detection module 1000 is not in use.

The negative analog regulator 1022 provides a fixed negative voltage to the analog components of the detection module 1000, preferably negative 5 volts. The negative analog regulator 1022 is not always in the "on" state. The processor 1006 may place the negative analog regulator 1022 in a "sleep" state to conserve power when the detection module 1000 is not in use.

The switched inverter 1024 inverts the power from the power source 1016 from a positive voltage to a negative voltage. This negative voltage then is provided to the negative analog regulator 1022.

The output interface 1010 transmits data from the detection module, preferably using magnetic field transmission with a single keyed frequency of about 29 kHz. The output interface 1010 comprises a tank 1026, a tank regulator 1028, and a frequency driver 1030.

The tank 1026 transmits data from the detection module 1000 to a receiver 224 (see FIG. 2). Typically, the tank 1026 is a series resonant ferrite rod inductor antenna. However, the tank 1026 also may be a parallel resonant inductor antenna.

The tank regulator 1028 provides an adjustable power supply to the tank 1026. The tank regulator 1028 is not always in the "on" state. The processor 1006 may place the tank regulator 1028 in a "sleep" state to conserve power when the detection module 1000 is not in use.

The frequency driver 1030 generates and modulates a frequency that is provided to the tank 1026. The frequency driver 1030 provides frequency control and phase inversion for each side of the tank 1026 so that power is alternately provided to the tank from opposing sides of the tank. The frequency driver 1030 comprises an oscillator/frequency counter 1032, a gate driver 1034, a first complimentary pair of field effect transistors (FETs) 1036, and a second complimentary pair of FETs 1038.

The oscillator/frequency counter 1032 provides an oscillating signal that is controlled by a frequency divider/counter to generate a frequency signal, preferably of about 29 kHz. The gate driver 1034 is a buffer that drives the gates of the FETs 1036 and 1038 based upon a phase inversion of the frequency signal and a control signal from the processor 1006 to turn the gate driver on and off. The FETs 1036 and 1038 are P-channel and N-channel complimentary FET pairs that are arranged in an H-bridge configuration and that regulate the power input into the tank 1026 from the tank regulator 1028. The FETs 1036 and 1038 allow power into the tank when they are gated by the gate driver 1034.

The optional sensor assembly 1014 provides additional environmental and navigation data to the processor 1006. The optional sensor assembly 1014 comprises a roll sensor 1040, a temperature sensor 1042, and a pitch sensor assembly 1044 which has a pitch sensor 1046.

The roll sensor 1040 collects roll data samples so that the processor 1006 can determine the rotation or roll angle of the boring tool 202 (see FIG. 2). A roll sensor 1040 can be used to provide correction for any effects of roll angle that might influence a pitch angle determination. In addition, the data from the roll sensor 1040 is used for coordinate axes reprojection, and it allows the processor 1006 to determine when the detection module 1000 remains in the same position and is not being used so that the processor may place the regulators 1020, 1022, and 1030 in the "sleep" state. The roll sensor 1040 can be, for example, a mercury sensor.

The temperature sensor 1042 collects temperature data samples so that the processor 1006 can determine the temperature around the detection module 1000. The temperature data samples are provided to the processor 1006 to be used for temperature compensation for sensor components that may vary as a function of temperature. For example, the readings of the pitch sensor 1046 can be compensated for temperature as they may vary with an increase or a decrease in temperature.

The pitch sensor assembly 1044 collects data samples indicative of the pitch of the detection module 1000 so that the pitch angle of the detection module 1000 can be determined. The pitch angle may be used for coordinate axes reprojection and navigation. The pitch sensor assembly 1044 is comprised of a pitch sensor 1046 and a digital potentiometer (pot) 1048.

The pitch sensor 1046 detects pitch data samples of a pitch angle and transmits the results of the pitch data samples to the processor 1006. The data samples generally are transmitted first as an analog signal to the mux/converter 1004 to be converted to a digital format before being sent to the processor 1006. However, in some cases, the pitch sensor 1046 is capable of transmitting the pitch data samples in a signal directly to the processor 1006 in a digital format. The pitch sensor 1046 may be a device, such as an accelerometer, with a single sensitive axis or multiple axes.

The digital pot 1048 is part of a system for providing temperature compensation and offset compensation for the pitch sensor 1046. The digital pot 1048 is a high resolution resistor that is controlled by a digital network, such as the processor 1006. The processor 1006 selects a tap point in the digital pot 1048 to set the value of the resistance in the digital pot.

Figure 11:
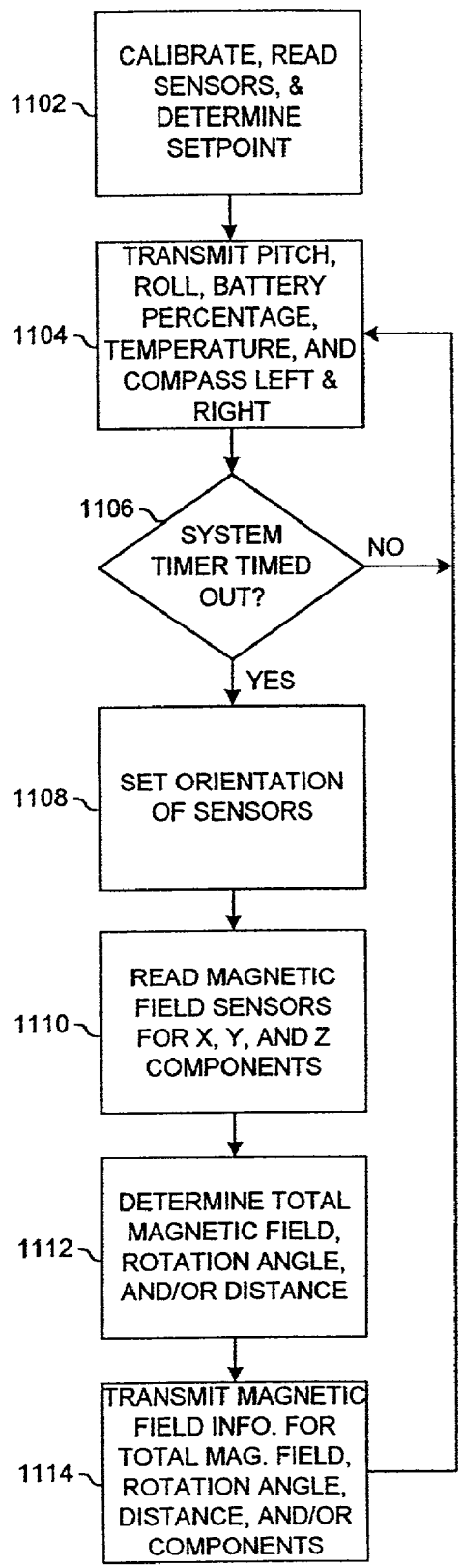
FIG. 11 is a flow diagram of a version of software that is operative in the processor of FIG. 10.

FIG. 11 illustrates software that is operative in the processor 1006 of the detection module 1000 of FIG. 10. The magnetic sensor assembly 1002 and the sensors in the optional sensor assembly 1014 are calibrated, and the total magnetic field reference value setpoint is determined (step 1102). The sensors in the optional sensor assembly 1014 and the DC components from the magnetic sensor assembly 1002 are read and processed, and the pitch, roll, battery level percentage, temperature, and compass information are transmitted from the detection module 1000 as process data in an output signal to a receiver 224 (FIG. 2) through the output interface 1010 (step 1104).

Because many pieces of information are transmitted from the detection module 1000, including pitch, roll, battery level percentage, temperature, compass information, and magnetic field information, each piece of information is designated a time slot in which it can be transmitted from the detection module. Thus, the magnetic field information may be transmitted at the time designated for that transmission. Therefore, if the timer has not timed out (step 1106), so that the transmission of the magnetic field information may occur, then the system returns to step 1104. If the timer has timed out (step 1106), then the orientation of the magnetic sensor assembly 1002 is set (step 1108).

Next, the magnetic field components are read (step 1110). Depending on whether passive magnetic field information is to be determined, active magnetic field information is to be determined, or both, the processor 1006 computes the process data for the total magnetic field, the distance to an object with an active magnetic field, and/or the rotation angle to an object with an active magnetic field (step 1112). The process data, including the total magnetic field, the distance, the rotation angle, and/or the magnetic field components, then is transmitted from the output interface 1010 as process data in an output signal to a receiver 224 (step 1114). The process then returns to step 1104.

It will be appreciated that the components of the detection module may be placed in other configurations. The systems of FIG. 12 and FIG. 13 provide two such examples.

Figure 12:
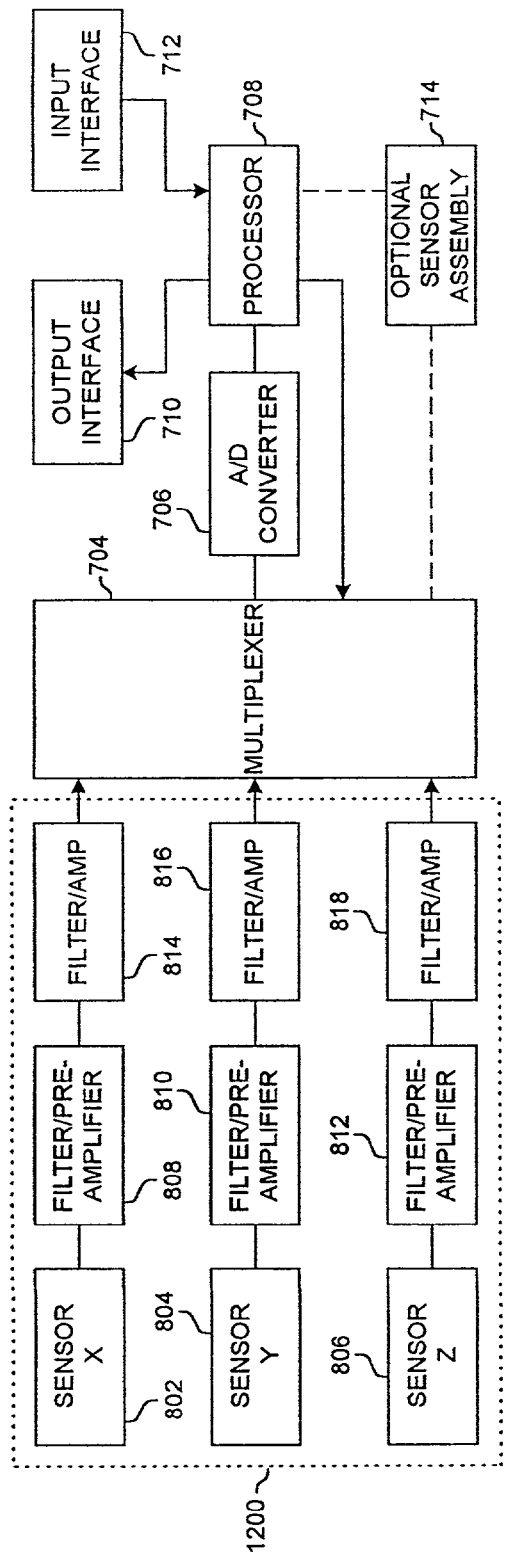
FIG. 12 is a block diagram of another version of a circuit for sensing and processing magnetic field information in accordance with the present invention.

In FIG. 12, a detection module 1200 comprises a magnetic sensor assembly 1202 having one or more magnetic field sensors 802, 804, and 806. Each magnetic field sensor 802, 804, and 806 is connected to a filter/preamplifier assembly 808, 810, and 812, and then to a filter/amplifier assembly 814, 816, and 818. However, there are no detector components as in FIG. 8. Instead, individual magnetic field components are transferred in sensor signals through the multiplexer 704 and the A/D converter 706 to the processor 708. From the processor 708, the individual magnetic field components are transmitted as process data in an output signal from the output interface 710 to a receiver 224 (FIG. 2) at the surface where the magnetic field information is computed as needed.

Figure 13:
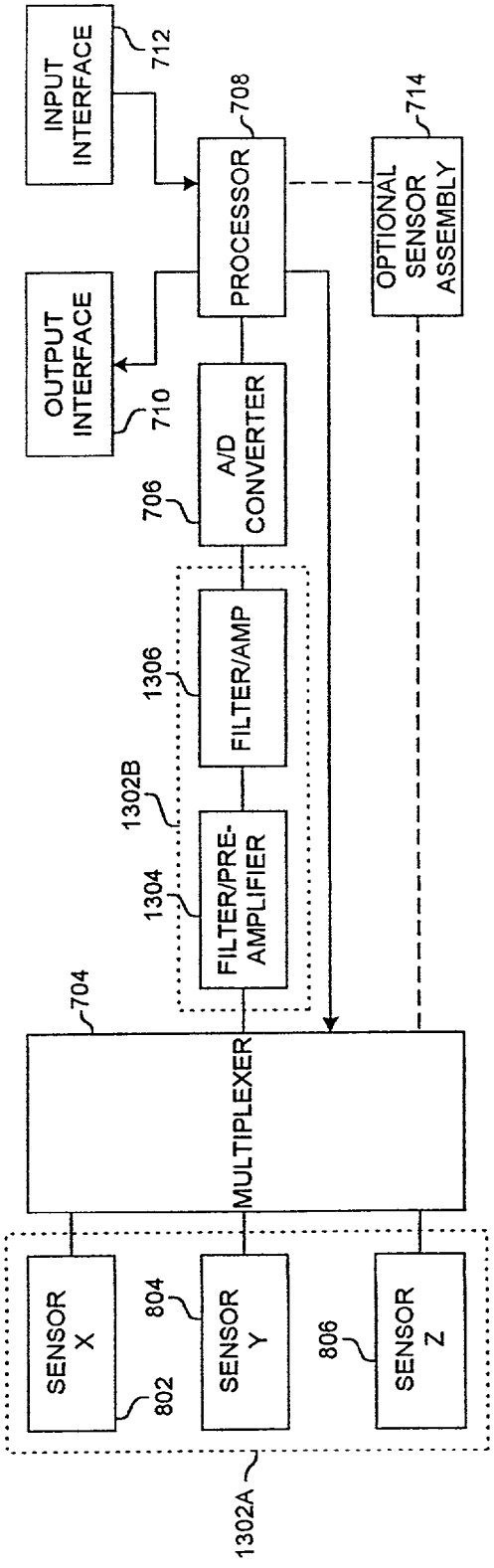
FIG. 13 is a block diagram of another version of a circuit for sensing and processing magnetic field information in accordance with the present invention.

FIG. 13 illustrates a minimum hardware configuration. In FIG. 13, a detection module 1300 comprises a magnetic sensor assembly 1302A and 1302B having one or more magnetic field sensors 802, 804, and 806. Each magnetic field sensor 802, 804, and 806 is connected to a multiplexer 704 that receives a sensor signal containing magnetic field component data from each magnetic field sensor. A filter/preamplifier 1304 filters the signals and amplifies the gain of the signals. A filter/amplifier assembly 1306 provides additional filtering and gain amplification before transmitting the signals to the A/D converter 706 to be converted to a digital format. Then, the processor 708 processes the signals to determine the required magnetic field information and transmits the magnetic field information in an output signal out the output interface 710.

Those skilled in the art will appreciate that variations from the specific embodiments disclosed above are contemplated by the invention. The invention should not be restricted to the above embodiments and is capable of modifications, rearrangements, and substitutions of parts and elements without departing from the spirit and scope of the invention.

What is claimed is:

1. A control system for use in boring comprising:
    a detection module comprising:
        a magnetic sensor assembly adapted to detect magnetic field components generated at a filamentary object; and
        a processor adapted to receive the magnetic field components from the magnetic sensor assembly, to process the magnetic field components for amplitude and phase relationships at a single location to determine orientation of the magnetic sensor assembly relative to the object, and to communicate orientation information; and
    a steering system adapted to receive the orientation information from the processor and to maneuver a boring tool in response to the orientation information from the processor.

2. The control system of claim 1 wherein the magnetic field components are representative of an alternating magnetic field.

3. The control system of claim 2 wherein the filamentary object is positioned on the surface of the ground.

4. The control system of claim 2 wherein the detection module is located in a boring tool.

5. The control system of claim 4 wherein the processor is located in a boring tool.

6. The control system of claim 5 wherein the steering system is located in a boring machine.

7. The control system of claim 6 wherein the orientation information is communicated to the steering system by telemetry.

8. The control system of claim 4 wherein the processor is located in a tracker.

9. The control system of claim 8 wherein magnetic field components are communicated to the processor by telemetry.

10. The control system of claim 2 wherein the magnetic sensor assembly is adapted to detect magnetic field components in each of three mutually orthogonal directions, representing a horizontal magnetic field component, a vertical magnetic field component, and z-axis magnetic field component.

11. The control system of claim 10 wherein the steering system maneuvers the boring tool to maintain a desired relative orientation of the boring tool with respect to the filamentary object.

12. The control system of claim 11 wherein the desired orientation comprises radial separation between the filamentary object and the boring tool.

13. The control system of claim 11 wherein the desired orientation comprises, in a plane normal to the filamentary object, a desired ratio of an amplitude of the horizontal magnetic field component to an amplitude of the vertical magnetic field component.

14. The control system of claim 11 wherein the desired orientation comprises, in a plane normal to the filamentary object, a desired phase relationship between an amplitude of the horizontal magnetic field component and an amplitude of the vertical magnetic field component.

15. The control system of claim 11 wherein a source of the alternating magnetic field at the object is connected to the processor to provide a phase reference.

16. The control system of claim 15 wherein the desired orientation comprises, in a plane normal to the filamentary object, a desired ratio of an amplitude of the horizontal magnetic field component to an amplitude of the vertical magnetic field component.

17. The control system of claim 15 wherein the desired orientation comprises, in a plane normal to the filamentary object, a desired phase relationship between an amplitude of the horizontal magnetic field component and an amplitude of the vertical magnetic field component.

18. A method for maintaining a detection module in a known orientation with an object comprising:
  measuring magnetic field components from a filamentary object;
  processing the magnetic field components for magnitude and phase relationships at a single location to determine an orientation of the detection module relative to the filamentary object;
  communicating orientation information to a steering system; and
  maneuvering a boring tool in response to the orientation information.

19. The method of claim 18 wherein the magnetic field components are representative of an alternating magnetic field.

20. The method of claim 19 wherein the magnetic field components are measured in each of three mutually orthogonal directions, representing a horizontal magnetic field component, a vertical magnetic field component, and z-axis magnetic field component.

21. The method of claim 20 wherein the boring tool is maneuvered to maintain a desired relative orientation of the boring tool with respect to the filamentary object.

22. The method of claim 21 wherein the desired orientation comprises radial separation between the filamentary object and the boring tool.

23. The method of claim 21 wherein the desired orientation comprises, in a plane normal to the filamentary object, a desired ratio of an amplitude of the horizontal magnetic field component to an amplitude of the vertical magnetic field component.

24. The method of claim 21 wherein the desired orientation comprises, in a plane normal to the filamentary object, a desired phase relationship between an amplitude of the horizontal magnetic field component and an amplitude of the vertical magnetic field component.

25. The method of claim 21 further comprising determining the phase of a source of the alternating magnetic field at the object to provide a phase reference.

26. The method of claim 25 wherein the desired orientation comprises, in a plane normal to the filamentary object, a desired ratio of an amplitude of the horizontal magnetic field component to an amplitude of the vertical magnetic field component.

27. The method of claim 25 wherein the desired orientation comprises, in a plane normal to the filamentary object, a desired phase relationship between an amplitude of the horizontal magnetic field component and an amplitude of the vertical magnetic field component.

* * * * *

UNITED STATES PATENT AND TRADEMARK OFFICE
CERTIFICATE OF CORRECTION

| | | |
|---|---|---|
| PATENT NO. | : 7,038,454 B2 | Page 1 of 1 |
| APPLICATION NO. | : 10/134985 | |
| DATED | : May 2, 2006 | |
| INVENTOR(S) | : Michael F. Gard and Jian Jin | |

It is certified that error appears in the above-identified patent and that said Letters Patent is hereby corrected as shown below:

On the Title Page, Item (57) "Abstract" should read as follows:

A system and method uses magnetic field sensing to detect objects for guiding a boring tool. The system detects magnetic field components in an active magnetic field generated at an object. A detection module has a magnetic sensor assembly that detects the magnetic field components. The data is processed by a processor to determine the orientation of the detection module with respect to the object. The processor communicates orientation information to a steering system for use in maneuvering a boring tool.

Signed and Sealed this

Eighteenth Day of September, 2007

JON W. DUDAS
*Director of the United States Patent and Trademark Office*